United States Patent
Biagiotti

(10) Patent No.: US 6,427,825 B1
(45) Date of Patent: Aug. 6, 2002

(54) DEVICE FOR SEPARATING FROM EACH OTHER A PLURALITY OF ARTICLES WHICH ARE IN CONTACT WITH EACH OTHER

(75) Inventor: Guglielmo Biagiotti, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 0 days.

(21) Appl. No.: 09/623,431
(22) PCT Filed: Mar. 11, 1999
(86) PCT No.: PCT/IT99/00058
§ 371 (c)(1),
(2), (4) Date: Sep. 5, 2000
(87) PCT Pub. No.: WO99/46193
PCT Pub. Date: Sep. 16, 1999

(30) Foreign Application Priority Data

Mar. 13, 1998 (IT) .......................................... FI98A0058

(51) Int. Cl.[7] .............................................. B65G 47/31
(52) U.S. Cl. ..................... 198/461.2; 198/411; 198/412
(58) Field of Search ................................ 198/411, 412, 198/408, 416, 450, 461.1, 461.2, 454.2

(56) References Cited

U.S. PATENT DOCUMENTS

| | | | |
|---|---|---|---|
| 3,713,650 A | * | 1/1973 | Hodgkinson et al. ... 198/408 X |
| 3,901,166 A | * | 8/1975 | Moraudi et al. ............ 198/411 |
| 4,122,938 A | * | 10/1978 | Walz et al. ................. 198/411 |
| 4,164,996 A | | 8/1979 | Tomlinson |
| 4,215,774 A | * | 8/1980 | Manservisi ............. 198/450 X |
| 4,519,492 A | * | 5/1985 | Focke ................. 198/461.2 X |
| 5,310,041 A | * | 5/1994 | Draghetti |

FOREIGN PATENT DOCUMENTS

| | | |
|---|---|---|
| CH | 535 704 | 5/1973 |
| DE | 2 322 380 | 11/1974 |
| DE | 25 24 306 | 8/1976 |

* cited by examiner

Primary Examiner—James R. Bidwell
(74) Attorney, Agent, or Firm—Breiner & Breiner, L.L.C.

(57) ABSTRACT

A description is given of a device for separating from each other a plurality of objects (R) which are adjacent to each other and are being fed in a direction of advance (F) along an advance path (21), comprising a member (37) which is rotatable about an axis of rotation (37A) and is positioned, with respect to the direction of advance, in such a way that it interferes with the articles (R) fed along said advance path. The peripheral velocity of said rotatable member at the point of contact between said member and said articles has a component substantially matching the direction of advance of the articles along said path.

30 Claims, 2 Drawing Sheets

DEVICE FOR SEPARATING FROM EACH OTHER A PLURALITY OF ARTICLES WHICH ARE IN CONTACT WITH EACH OTHER

TECHNICAL FIELD

The present invention relates to a device which can be used to separate from each other a plurality of similar articles which are adjacent to each other.

More particularly, the present invention relates to a device which is particularly suitable for separating from each other the rolls of a series or plurality of rolls of wound-up webmaterial, for example of the type produced by what is known as a rewinding and cutting machine, or rolls of cardboard produced by a cutting machine, rolls of printing paper, rolls of adhesive tape or other.

PRIOR ART

In the paper converting industry use is made of machines for producing rolls of paper material, for example rolls of toilet paper of relatively large diameter, usable in dispensers or feeders for communal areas, public premises or similar. These machines unwind the webmaterial from an initial reel having a large axial length, and cut the webmaterial by means of normally rotating cutters located along the path of the advance of the strip, to produce a plurality of bands of webmaterial with a width equal to the axial length of the finished rolls. The individual bands are then wound into a plurality of rolls which are axially aligned with each other and which must then be sent individually to the packaging machines.

Machines of this type are produced by the applicant and marketed under the trade name of "Rodina 57.00" and "Rodumat 58.00". Similar machines are produced, for example, by Jageneberg of Germany, and marketed under the name "Vari-Dur".

One of the problems found in these machines is due to the fact that the bands of webmaterial tend to deviate in the area between the cutting and the winding, thus causing a partial overlapping and consequent interconnection of adjacent rolls caused by the partial penetration of the turns of one roil into those of the adjacent rolls. This causes problems in the subsequent packaging stages, since interconnected rolls cannot be packaged.

Similar problems occur, for example, in machines called cutting machines for producing rolls of cardboard from strips of cardboard of greater length, or in machines for producing paper rolls for calculating machines or other office machines. Similar requirements may also arise in the adhesive tape industry, where the rolls of adhesive tape are produced by longitudinal cutting and rewinding from reels of large axial length.

For separating rolls of paper material from each other, there are existing devices with rotating blades which act in a direction orthogonal to the advance of the rolls. These devices are not versatile and have considerable disadvantages in operation.

OBJECTS AND SUMMARY OF THE INVENTION

The object of the present invention is to provide a device which can be used to avoid the problems occurring at the packaging stage and which can be used to separate efficiently from each other the rolls produced by a rewinding and cutting machine or other similar machine.

More generally, the object of the present invention is to provide a device which can be used to separate efficiently from each other two or more similar articles which are adjacent to each other and may be partially adhering to each other.

These and other objects and advantages, which will be clearly understood by those skilled in the art from the reading of the following text, are essentially achieved by means of a device for separating from each other a plurality of objects which are adjacent to each other and are being fed in a direction of advance along an advance path, comprising a member which is rotatable about an axis of rotation and is positioned, with respect to the direction of advance, in such a way that it interferes with the articles fed along said advance path, the peripheral velocity of said rotatable member at the point of contact between said member and said articles having a component substantially matching the direction of advance of the articles.

The rotatable member strikes the areas of the individual articles approximately opposite the areas with which they rest on the advance path, in such a way as to force the individual articles to detach themselves from each other and also, if necessary, to tilt. The lower support terminates upstream of the point at which the rotatable member acts on the individual articles. The detachment is the result of a combined action of the thrust of the rotatable member and the end of the lower support. A device of this type is particularly advantageous if it is located at the discharge end of a rewinding and cutting machine or other machine capable of simultaneously producing series of rolls of wound-up webmaterial, from individual bands of material which are fed in parallel paths. Preferably, the axis of rotation of the rotatable member is orthogonal to the direction of advance of the articles.

In a particularly advantageous embodiment of the invention, the rotatable member comprises a wheel carrying a plurality of rollers arranged with their axes parallel to the axis of rotation of the wheel and positioned around a circumference whose center is on the axis of the wheel. The individual rollers strike adjacent articles which are advancing along the advance path, to push them apart from each other. The surface of the rollers may advantageously be shaped to match the shape of the articles. In the case of rolls of webmaterial, it is advantageous for the rollers to have a concave profile, and for the axial cross-section of the profile to have a radius of curvature equal to or slightly greater than the radius of curvature of the rolls. In the case of a device suitable for operating on rolls of variable diameter, the profile of the curve defining the outer surface of the concave roller may be equal to or greater than the maximum radius of the rolls to be handled.

In a particularly advantageous embodiment of the present invention, the rollers are supported so that they are free-running on said wheel. One result of this is to avoid the risk of damaging the articles on which the rollers act. This is particularly useful in the case of articles consisting of rolls of paper, for example tissue paper, such as rolls of toilet paper or similar products.

The rollers are preferably individually removable from the rotatable member. Additionally, this member is rotated by an actuator which allows the rotation speed to be modified (at least within certain limits). In this way it is possible to match the device to articles of various sizes. In the case of rolls of wound-up webmaterial, it is possible to arrange for each roll to be struck at least once by the rotatable member, in other words by one of the rollers supported by the aforesaid wheel. This is achieved by removing some of the rollers, if necessary, when the axial dimension of the rolls increases and/or by modifying the rotation speed.

It is advantageous to arrange for the rotary movement of the rotatable member to be in phase with the movement of displacement of the individual articles along the advance path, in such a way that each article always receives a thrust at the same point. This may be achieved by means of a suitable mechanical drive and timing members included in it. Alternatively, and preferably, the timing may be provided electronically by a control unit which controls two motors, one for the rotation of the rotatable member and the other for the advance of the articles.

In general, for optimal operation, the speed of rotation of the rotatable member is such that, in the area in which the impact with the articles to be separated takes place, the rotatable member has a peripheral velocity of, for example, 1.5 or 2 times the speed of advance of the articles.

The advance path may be defined by a conveyer of the belt or other type, on which the individual articles rest. However, in a particularly advantageous embodiment, the advance path of the articles is defined by a guide along which said articles are pushed by a pusher. The rotatable member is located above said guide.

Further possible advantageous characteristics of the invention are indicated in the attached dependent claims and described with reference to an example of an embodiment.

With the device according to the present invention, it is a simple matter to modify the direction and amount of the thrust exerted on the individual articles. The device can also be adapted easily to different sizes of the articles to be handled.

BRIEF DESCRIPTION OF THE DRAWINGS

The invention will be more clearly understood from the description and the attached drawing, which shows a practical and non-restrictive example of the invention. In the drawing.

DETAILED DESCRIPTION OF THE PREFERRED EMBODIMENT OF THE INVENTION

Figure 1:
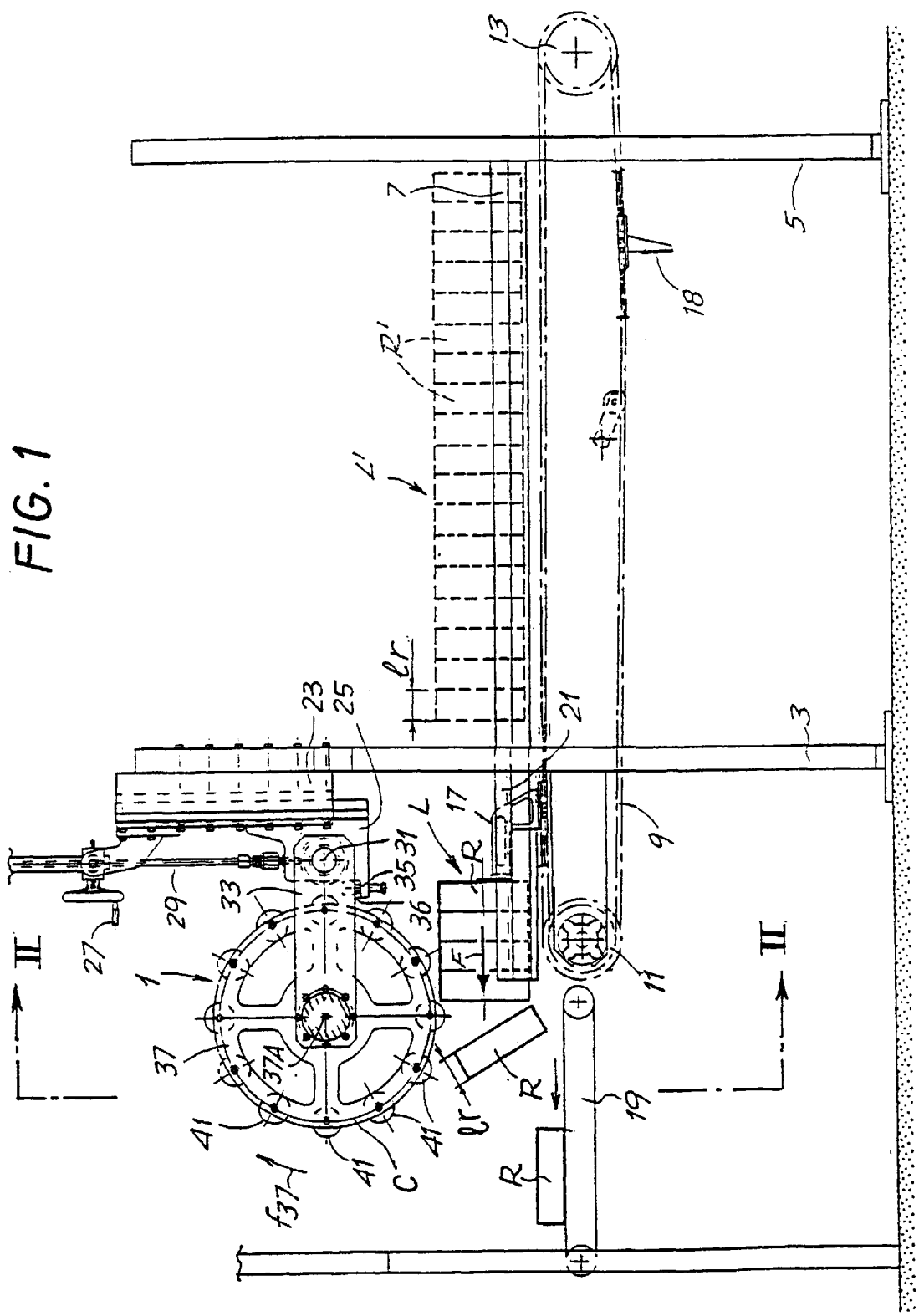
FIG. 1 is a side view of the device according to the invention.

With initial reference to FIG. 1, the device indicated in a general way by 1 is linked to a side member 3 of a rewinding and cutting machine which is not shown and is of a type known per se. The second side member of the rewinding machine is indicated by 5. The letter L indicates a set of rolls R aligned with and adjacent to each other in the axial direction. They have been formed by the rewinding and cutting machine, and are now located on a discharge guide 7, which consists for example of a pair of sections forming a cradle supporting the rolls R. Under the guide 7 there is an endless flexible member 9, for example a chain, running around two wheels 11, 13, one of which is powered by an actuator, for example an electric motor 15, shown in FIG. 2. The flexible member 9 is provided with a pusher 17 which pushes the rolls R forward in the direction of the arrow F, to discharge them from the guide 7. When the discharge of a set L of rolls R is completed, the pusher 17 is made to withdraw in the opposite direction to the arrow F before a new set L' or rolls R' is positioned in the configuration shown in broken lines in FIG. 1. A second pusher 18 located along the lower run of the flexible member 9 is used to discharge any defective or rejected rolls on the opposite side. In this case, the flexible member 9 makes an additional movement in the opposite direction to the arrow F.

The return wheel 11 is located outside the side members 3, 5, in the vicinity of a conveyer which is indicated schematically in a general way by 19, and which is used to convey the rolls R to a subsequent station for packaging or some other process. From the side member 3 there extend toward the conveyer 19 a guide 21 which forms the extension of the guide 7, formed by a pair of sections 21A, 21B (see FIG. 2), along which the rolls R are made to slide by the pusher 17. The length of the guide 21 is adjustable.

A vertical guide 23, along which a sliding unit 25 can be positioned and locked, is fitted to the side member 3. The position of the sliding unit 25 can be adjusted by means of a handwheel 27 and a screw jack 29. The sliding unit 25 carries a projecting arm 33 which is pivoted at 31 and rests on an adjustable stop 35. The adjustable stop 35 is associated with a sensor or microswitch or the like, indicated in a general way by 36, for the purposes described below.

The arm 33 carries, at the opposite end from the pivot point 31, a wheel 37 with axis 37A, rotated by an actuator 39, which in the illustrated example consists of a gearmotor coaxial with the wheel 37.

A plurality of rollers 41, whose axes are located around a circumference C having its center on the axis 37A of the wheel 37, are fitted so that they are free-running on the wheel 37. The rollers 41 have concave outer surfaces, as shown clearly in FIG. 2.

The position of the sliding unit 25 and consequently of the arm 33 is adjusted in such a way that the rollers 41 interfere lightly with the upper peripheral areas of the rolls R which are being pushed by the pusher 17 along the guide 21. Since the arm 33 is pivoted at 31 and rests on the adjustable stop 35, It is simple to make even precise adjustments of the position of the wheel 37 with respect to the guide 21.

The described device operates in the following way. When the rolls R are made to advance in the direction of the arrow F by the pusher 17, they pass under the wheel 37 which rotates in a clockwise direction (arrow f37) in the illustrated example. Since the rollers 41 lightly strike the cylindrical surfaces of the rolls R, they strike each roll and thus tend to detach each individual roll R from the following roll, causing it to tilt. Consequently, even when the rolls R of a single set L are adhering lightly to each other—owing to the slight overlapping of the bands of webmaterial from which the individual rolls R are simultaneously formed—the action of the wheel 37 and of the rollers 41 ensures that the rolls R are detached from each other. The rolls are thus positioned with their axes vertical on the conveyer 19.

The speed of rotation of the wheel 37 (controlled by the actuator 39, for example an electric motor of the "brushless" type) and the spacing between the rollers 41 are chosen in such a way that each roll R is struck by at least one roller 41 and at the point at which the rollers 41 strike the rolls R the speed of the rollers is approximately 1.5–2 times the speed of advance of the rolls R.

If, in spite of the impact of the roller 41, a roll R is not detached from the next roll and is not tilted, its continued advance raises the wheel 37 with a consequent pivoting of the support arm 33 about the pivot 31. The sensor associated with the stop 35 detects this condition and causes the generation of an alarm signal for the operator, or the stopping of the machine by means of a suitable control unit.

The axis of rotation of the wheel 37 is placed in a position forward of the terminal area of the guide 21, in the direction of advance of the rolls R, to facilitate the discharge and tilting of the rolls.

When the axial dimension "Ir" of the rolls changes, the device 1 can be adapted by modifying the rotation speed and/or by removing some of the rollers 41, for example one out of every two, to maintain the operating conditions described above.

Figure 2:
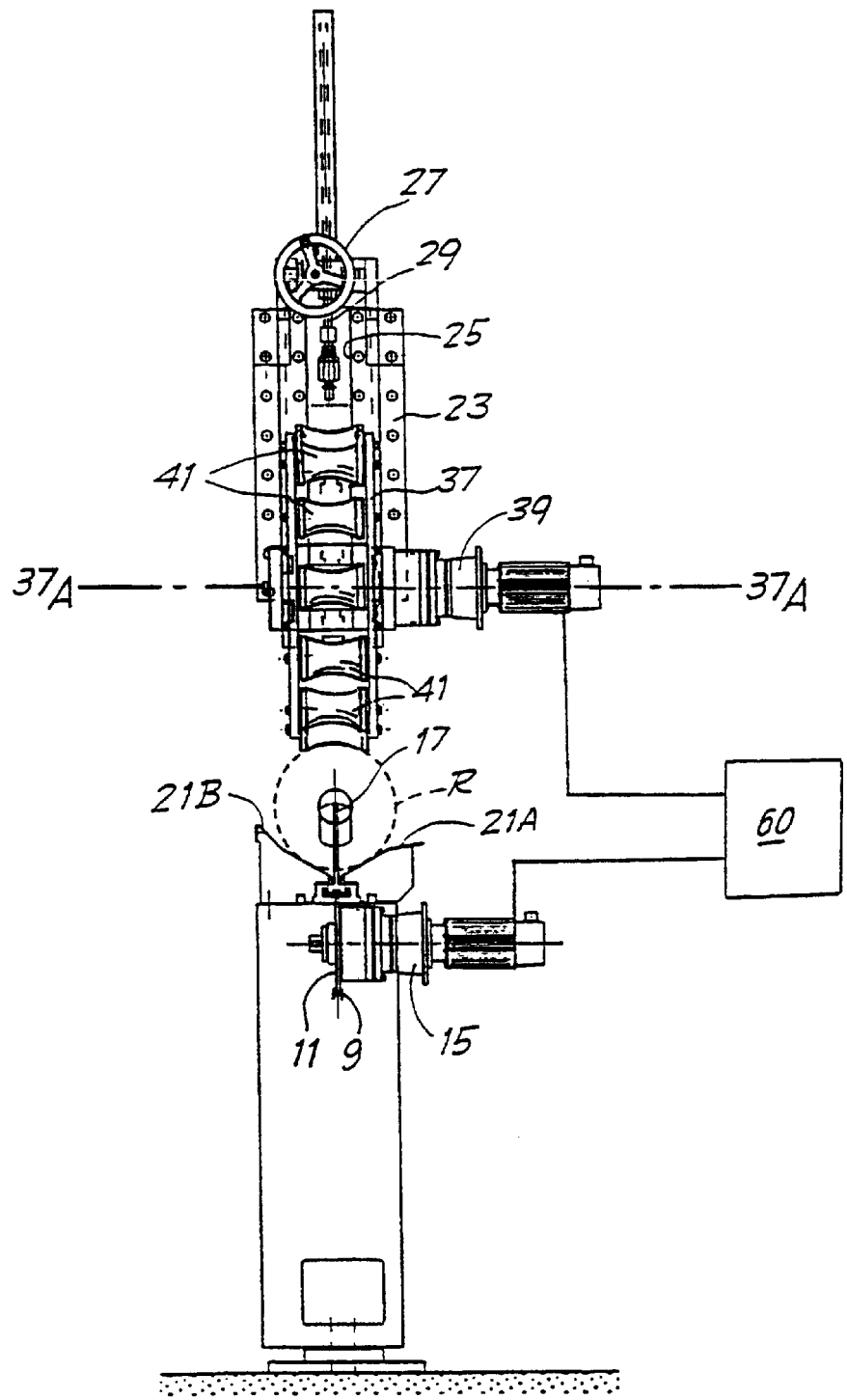
FIG. 2 is a front view through II—II in FIG. 1.

The timing between the rotation of the wheel 37 and the advance of the rolls R is corrected by adjusting a central control unit 60 shown schematically in FIG. 2, which controls the two actuators 15, 39.

In the illustrated example, the wheel 37 has twelve rollers 41 equidistant from each other. This number was chosen since it is particularly advantageous in terms of the flexibility and adaptability of the device to different operating conditions. It is possible to decrease the maximum number of twelve rollers 41, by removing some of them, to configurations having six, four, three or two rollers, still equidistant from each other. In this way it is possible to operate with six different configurations of the wheel 31, namely with 1, 2, 3, 4, 6 or 12 equidistant rollers.

The guide 21 can be adjusted and moved backward or forward. It is possible, for example, to remove one roller 41 out of every two from the configuration shown in FIG. 1, thus obtaining a wheel 37 with six equidistant rollers 41. At the same time, the terminal edge of the guide 21 is moved backward, thus shortening the guide. When the wheel 37 is then rotated at higher speed, a greater thrust on the rolls R is obtained, since the impact speed is increased.

When there is a change in the diameter of the rolls R, the device 1 can be adjusted simply by modifying the position of the sliding unit 25 and consequently of the arm 33 in the vertical direction. The curvature of the concave area of the surface of the rollers 41 is such that it can be adapted even to diameters which may be very different from each other.

It is to be understood that the drawing shows only an example provided solely as a practical demonstration of the invention, and that this invention may vary in its forms and arrangements without departure from the scope of the guiding concept of the invention. The presence of any reference numbers in the attached claims has the purpose of facilitating the reading of the claims with reference to the description and to the drawing, and does not limit the scope of protection represented by the claims.

What is claimed is:

1. A device for separating from each other a plurality of articles which are in contact to each other and are being fed in a direction of advance along an advance path, comprising a support on which articles are advanced and a member which is driven into rotation and rotatable about an axis of rotation and is positioned, with respect to the direction of advance, in such a way that the member interferes with the articles fed along said advance path, the peripheral velocity of said member in rotation at a point of contact between said member and one of said articles having a directional component substantially oriented to the direction of advance of said articles along said path, said member striking each article forcing the article to detach from a following article.

2. Device as claimed in claim 1, wherein said axis of rotation is substantially orthogonal to the direction of advance of said articles.

3. Device as claimed in claim 1, wherein said advance path is defined by a guide along which said articles are pushed by a pusher, said member being located above said guide.

4. Device as claimed in claim 3, wherein the axis of rotation of said member is located, along the direction of advance of said articles, in a position further forward than a point at which said guide terminates.

5. Device as claimed in claim 1, wherein distance between said member and said advance path is orthogonally adjustable.

6. Device as claimed in claim 5, wherein said member is carried by a sliding unit which is adjustable along a vertical guide.

7. Device as claimed in claim 3, wherein said guide is lengthwise adjustable.

8. Device as claimed in claim 1, wherein said member is supported by an arm pivoted about an axis substantially parallel to the axis of rotation of the member, and rests on a stop.

9. Device as claimed in claim 8, wherein said stop is adjustable.

10. Device as claimed in claim 8, wherein said arm is associated with a sensor which detects any pivoting of the arm.

11. Device as claimed in claim 1, wherein said member is driven by a variable-speed actuator.

12. Device as claimed in claim 1, including means of advancing said articles and means of rotating said member, and timing members between said means of advance and said means of rotation.

13. Device as claimed in claim 12, wherein a central control unit is provided to keep a first actuator for advancing the articles in phase with a second actuator for rotating said member.

14. A device for separating from each other a plurality of articles which are in contact to each other and are being fed in a direction of advance along an advance path, comprising a support on which the articles are advanced and a member which is driven into rotation and rotatable about an axis of rotation and is positioned, with respect to the direction of advance, in such a way that the member interferes with the articles fed along said advance path, the peripheral velocity of said member at a point of contact between said member and one of said articles having a directional component substantially oriented to the direction of advance of said articles along said path, said member striking each article forcing the article to detach from a following article, wherein said member comprises a wheel carrying a plurality of rollers arranged with their axes parallel to the axis of rotation of said wheel and positioned around a circumference whose center is on the axis of the wheel.

15. A device for separating from each other a plurality of articles which are in contact to each other and are being fed in a direction of advance along an advance path, comprising a support on which the articles are advanced and a member which is driven into rotation and rotatable about an axis of rotation and is positioned, with respect to the direction of advance, in such a way that the member interferes with the articles fed along said advance path, the peripheral velocity of said member at a point of contact between said member and one of said articles having a directional component substantially oriented to the direction of advance of said articles along said path, said member striking each article forcing the article to detach from a following article, wherein said axis of rotation is substantially orthogonal to the direction of advance of said articles and said member comprises a wheel carrying a plurality of rollers arranged with their axes parallel to the axis of rotation of said wheel and positioned around a circumference whose center is on the axis of the wheel.

16. Device as claimed in claim 14 or 15, wherein said rollers are supported so that said rollers are free-running on said wheel.

17. Device as claimed in claim 14 or 15, wherein said rollers have a concave outer surface.

18. Device as claimed in claim 14 or 15, wherein said rollers are individually removable from said wheel.

19. Device as claimed in claim 14 or 15, wherein said wheel comprises twelve equidistant rollers.

20. Device as claimed in claim 14 or 15, wherein said advance path is defined by a guide along which said articles are pushed by a pusher, said wheel being located above said guide.

21. Device as claimed in claim 20, wherein the axis of rotation of said wheel is located, along the direction of advance of said articles, in a position further forward than a point at which said guide terminates.

22. Device as claimed in claim 14 or 15, wherein distance between said wheel and said advance path is orthogonally adjustable.

23. Device as claimed in claim 22, wherein said wheel is carried by a sliding unit which is adjustable along a vertical guide.

24. Device as claimed in claim 23, wherein said guide is lengthwise adjustable.

25. Device as claimed in claim 14 or 15, wherein said wheel is supported by an arm pivoted about an axis substantially parallel to the axis of rotation of the wheel, and rests on a stop.

26. Device as claimed in claim 25, wherein said stop is adjustable.

27. Device as claimed in claim 25, wherein said arm is associated with a sensor which detects any pivoting of the arm.

28. Device as claimed in claim 14 or 15, wherein said wheel is driven by a variable-speed actuator.

29. Device as claimed in claim 14 or 15, including means of advancing said articles and means of rotating said wheel, and timing members between said means of advance and said means of rotation.

30. Device as claimed in claim 29, wherein a central control unit is provided to keep a first actuator for advancing the articles in phase with a second actuator for rotating said wheel.

* * * * *